Patented Apr. 21, 1953

UNITED STATES PATENT OFFICE 2,636,039

4,4-DISUBSTITUTED 3-AMINO-5-HALOGEN-PYRAZOLES

Jean Druey, Riehen, Switzerland, assignor to Ciba Pharmaceutical Products, Inc., Summit, N. J.

No Drawing. Application January 8, 1951, Serial No. 205,037. In Switzerland February 13, 1950

5 Claims. (Cl. 260—310)

The present invention relates to new 4,4-disubstituted 3-amino-5-halogen-pyrazoles which correspond to the type formula

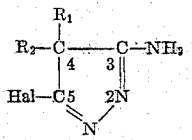

or, in the tautomeric form, to the type formula

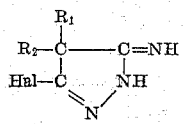

wherein $R_1$ is a lower aliphatic hydrocarbon group containing a maximum of 3 carbon atoms, $R_2$ is an aliphatic or a mononuclear alicyclic or mononuclear aromatic hydrocarbon radical, and Hal is a chlorine or bromine atom. The invention relates also to salts of the aforedescribed compounds.

These compounds, and particularly 3-amino-4-methyl-4-n-butyl-5-bromo-pyrazole and 3-amino-4-methyl-4-n-butyl-5-chloro-pyrazole, exert a sedative action.

The new aminopyrazoles are obtained by treating an aminopyrazolone which corresponds to the formula

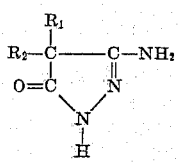

or its tautomer with a chlorinating or brominating agent. Particularly useful are the chlorides and bromides of phosphoric acid, such as phosphorus oxychloride, phosphorus pentachloride, phosphorus oxybromide, and phosphorus pentabromide. The reaction is preferably carried out at elevated temperature, that is, at a temperature of 100° C. or over.

The starting aminopyrazolones can be prepared, for example by reacting the corresponding disubstituted cyanoacetic acid ester with hydrazine.

Depending upon the procedure employed, the new compounds are obtained as bases or in the form of their salts. From the latter, the free bases can be obtained in conventional manner. From the bases, on the other hand, it is also possible to prepare salts with the most diverse acids, inorganic (for example, hydrochloric acid, phosphoric acid, etc.) as well as organic (for example, tartaric acid, methanesulfonic acid, etc.). Particularly suitable are those acids which have been used therapeutically, such for example as hydrobromic acid, salicylic acid, acetylsalicylic acid, etc.

The invention is described in greater detail in the following illustrative examples. Parts by weight bear the same relation to parts by volume as do grams to cubic centimeters. Temperatures are in degrees centigrade. Percentages are by weight.

Example 1

5 parts by weight of 3-amino-4,4-diethylpyrazolone-(5), prepared from diethylcyanoacetic acid-ethyl ester and hydrazine, are heated on a boiling water-bath for 2 hours with 20 parts by volume of phosphorus oxychloride, dissolution taking place gradually. Upon completion of the reaction, the greatest part of the excess phosphorus oxychloride is distilled off in vacuo, and water is added to the residue, the reaction mixture being allowed to reach a temperature of about 60°. Any undissolved impurities are removed by filtration, and an excess of aqueous caustic soda solution of 10% concentration is added to the acid filtrate. The reaction mixture is then cooled to about 25° and the crystallized 3-amino-4,4-diethyl-5-chloro-pyrazole of the formula

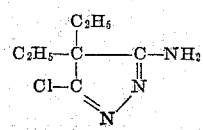

which is precipitated in good yield, is separated by suction filtration. The product melts at about 162°, with decomposition. It is readily soluble in acids.

By dissolving the said product in ethanolic hydrochloric acid and then adding ether, the hydrochloride—melting at 210°—is obtained.

Example 2

4.3 parts by weight of a 3-amino-4-n-butyl-4-methyl-pyrazolone-(5), prepared from n-butyl-methyl-cyanoacetic acid ethyl ester by reaction with hydrazine, are triturated with 8.6 parts by weight of phosphorus pentabromide and thereupon gradually heated to 100°. Upon further heating at this temperature, the mixture liquefies and finally becomes a solid again. After 2 hours, the mass is allowed to cool and the excess of phosphorus bromide decomposed with ice water. After digesting for a long time, the hydrobromide of 3-amino-4-n-butyl-4-methyl-5-bromo-pyrazole separates out in well crystallized form and in good yield. After recrystallization from water, it is pure and melts at 206–207°.

10 parts by weight of the hydrobromide are dissolved in 50 parts of warm water. Aqueous ammonia in excess is then added to the solution which is then suction-filtered. After recrystallization from water, the obtained free 3-amino-4-n-butyl-4-methyl-5-bromo-pyrazole of the formula.

$$\begin{array}{c} CH_3 \\ C_4H_9-C\text{------}C-NH_2 \\ Br-C\phantom{xxx}N \\ \diagdown N \diagup \end{array}$$

melts at 144–146°.

Example 3

5 parts by weight of 3-amino-4-phenyl-4-ethyl-pyrazolone-(5) and 20 parts by volume of phosphorus oxychloride are heated to 100° for 3 hours, solution taking place. The cooled reaction mixture is decomposed with ice, and then an excess of aqueous ammonia solution is added. After standing for 2 days, the precipitated product is extracted with chloroform, the chloroform solution is shaken out with 2-normal aqueous caustic soda solution while cooling and is then evaporated to dryness. Recrystallized from methanol, a good yield of 3-amino-4-phenyl-4-ethyl-5-chloro-pyrazole of the formula $$\begin{array}{c} C_2H_5 \\ C_6H_5-C\text{------}C-NH_2 \\ Cl-C\phantom{xxx}N \\ \diagdown N \diagup \end{array}$$

is obtained; it melts at 163–165°.

Example 4

By proceeding in the manner described in Examples 1 to 3, employing corresponding quantities of starting materials of the formula $$\begin{array}{c} R_1 \\ R_2-C\text{------}C-NH_2 \\ O=C\phantom{xxx}N \\ \diagdown N \diagup \\ H \end{array}$$

and of phosphorus oxychloride or phosphorus oxybromide, the corresponding products of the type formula $$\begin{array}{c} R_1 \\ R_2-C\text{------}C-NH_2 \\ Hal=C\phantom{xxx}N \\ \diagdown N \diagup \end{array}$$

and of the composition shown in the following table are obtained:

| $R_1$ | $R_2$ | Hal | Melting Point |
|---|---|---|---|
| methyl | n-butyl | Cl | 157° |
| Do | iso-butyl | Cl | 168° |
| Do | do | Br | 157–159° |
| Do | heptyl | Cl | 157° |
| Do | cyclohexenyl | Cl | 180° |
| ethyl | ethyl | Br | 165° |
| Do | n-butyl | Cl | 152–153° |
| Do | do | Br | 185° |
| Do | phenyl | Br | Approx. 145° |
| n-propyl | n-propyl | Cl | 174° |
| Do | do | Br | 162–163° |
| Do | n-butyl | Cl | 167° |
| Do | do | Br | 160° |
| allyl | allyl | Cl | 150° |
| Do | n-butyl | Cl | 160–162° |

Melting, in most cases, is accompanied by decomposition.

The starting 4,4-disubstituted 3-amino-pyrazolones-(5) can be obtained by reacting a correspondingly disubstituted cyanoacetic acid ester with hydrazine.

It will be understood that while the formulae in the preceding examples indicate only one of the tautomers, the products exist in the dynamic isomeric state which is characteristic of tautomerism, whereby the products effectively comprise also the others of the respective tautomers. Thus, for instance, the formula of the product of Example 1 may also be reproduced as $$\begin{array}{c} C_2H_5 \\ C_2H_5-C\text{------}C=NH \\ Cl-C\phantom{xxx}NH \\ \diagdown N \diagup \end{array}$$

The other formulas may also be analogously reproduced.

Having thus disclosed the invention, what is claimed is:

1. A member selected from the class consisting of the 4,4-disubstituted 3-amino-5-halogen-pyrazoles which correspond to the formulae $$\begin{array}{c} R_1 \\ R_2-C\text{------}C-NH_2 \\ Hal-C\phantom{xxx}N \\ \diagdown N \diagup \end{array}$$

and $$\begin{array}{c} R_1 \\ R_2-C\text{------}C=NH \\ Hal-C\phantom{xxx}NH \\ \diagdown N \diagup \end{array}$$

and their salts, wherein $R_1$ is a lower aliphatic hydrocarbon group with at most 3 carbon atoms, $R_2$ is a member selected from the group consisting of alkyl, cycloalkyl and mononuclear aromatic carbocyclic hydrocarbon radicals, and Hal is selected from the group consisting of chlorine and bromine.

2. 3-amino-4-methyl-4-n-butyl-5-bromo-pyrazole.

3. An acid salt of 3-amino-4-methyl-4-n-butyl-5-bromo-pyrazole.

4. The hydrobromide of 3-amino-4-methyl-4-n-butyl-5-bromo pyrazole.

5. 3-amino-4-methyl-4-n-butyl-5-chloro-pyrazole.

JEAN DRUEY.

References Cited in the file of this patent

Chemical Abstracts, vol. 8, p. 691, citing Berichte 46, p. 3612.5.

Gagnon, Canadian Journal Research, vol. 27B (1949), pp. 190–204.